Nov. 30, 1948.                R. E. J. NORDQUIST                2,454,831
                        CONVEYER TO FISH CANNING MACHINE
Filed May 29, 1946
                                                        2 Sheets-Sheet 2

INVENTOR.
Ronald E. J. Nordquist
BY Ivan D. Thornburgh
   Charles H. Erne
        ATTORNEYS Patented Nov. 30, 1948

2,454,831

UNITED STATES PATENT OFFICE 2,454,831

CONVEYER TO FISH CANNING MACHINE

Ronald E. J. Nordquist, Maplewood, N. J., assignor to American Can Company, New York, N. Y., a corporation of New Jersey Application May 29, 1946, Serial No. 673,113

8 Claims. (Cl. 198—210)

The present invention relates to a fish canning machine of the type having a supply tunnel in which pre-cut pieces of fish are collected preparatory to canning and has particular reference to improved feeding devices for advancing the fish through the tunnel toward the canning mechanism.

An object of the invention is the provision in a fish canning machine of feeding devices for advancing cut pieces of fish through a supply tunnel wherein the fish pieces are carried or pulled through the tunnel in spaced order and in a continuously moving procession so that crowding of the fish pieces against each other with the attendant excessive pressure and clogging of the fish in the tunnel will be prevented, thereby insuring free and easy passage of the fish pieces through the tunnel in a rapid yet gentle manner.

Numerous other objects and advantages of the invention will be apparent as it is better understood from the following description, which, taken in connection with the accompanying drawings, discloses a preferred embodiment thereof.

Referring to the drawings.

As a preferred embodiment of the invention the drawings illustrate an improved feeding device A for advancing pre-cut pieces of fish B preparatory to canning, through a supply tunnel C of a fish canning machine of the type disclosed in United States Patent 2,044,813, issued June 23, 1936 to W. E. Rooney on Fish canning machine.

Figure 1:
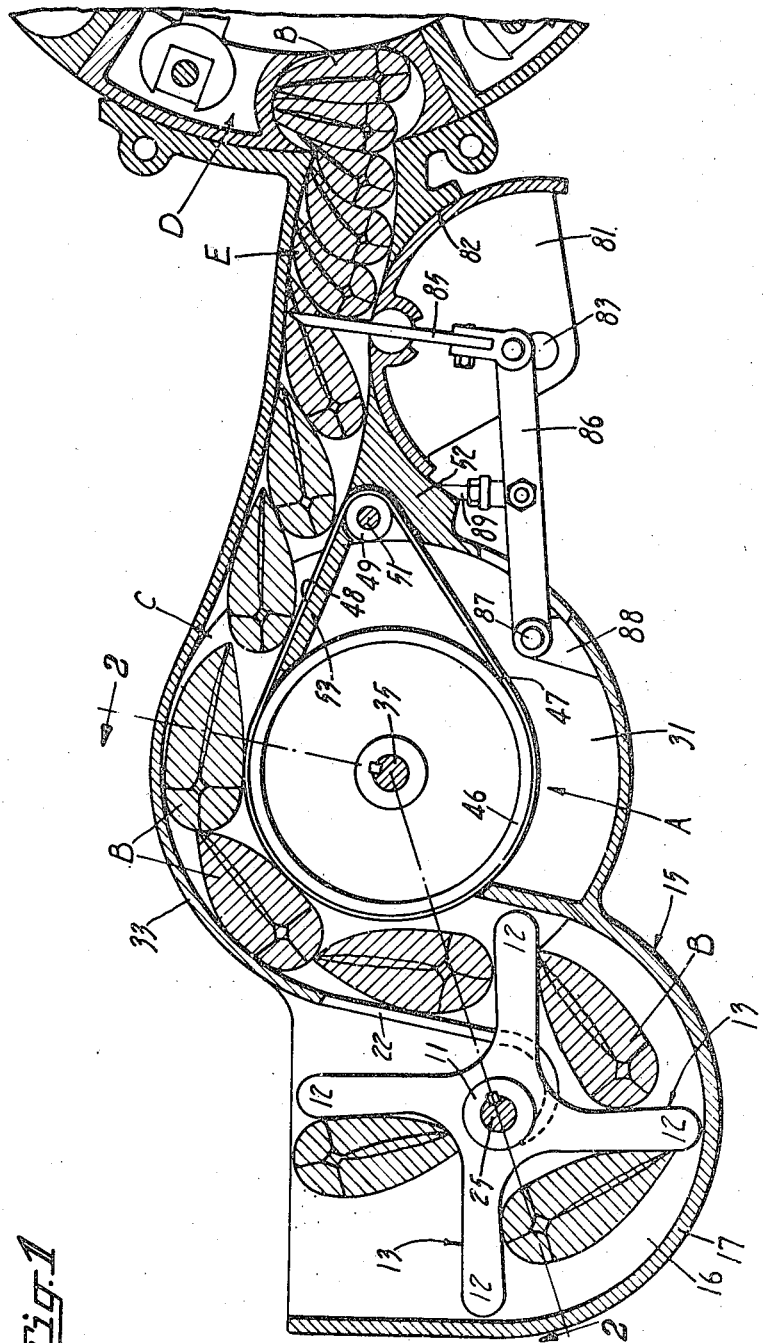
Figure 1 is a top plan sectional view of a portion of a fish canning machine embodying the instant invention, with parts broken away.

The supply tunnel C leads to a canning mechanism D. During the passage of the fish pieces through the tunnel it is desirable to prevent undue crowding of the fish so that the tunnel will not become clogged. Near the discharge end of the tunnel the fish pieces are collected and compressed into a compact mass E (Fig. 1). This fish mass is pressed forward into the canning mechanism D for measuring and for filling into cans as disclosed in the Rooney patent above mentioned.

The fish pieces B are fed into the supply tunnel C, from any suitable source of supply, by a rotatable paddle wheel 11 (Figs. 1 and 2) having a plurality of spaced feeding paddles 12 and intermediate pockets 13. This paddle wheel rotates within a portion of a housing 15 having a fish supporting floor 16 and a vertical curved side wall 17 which partially surrounds the paddle wheel. The housing may be secured to or form a part of the main frame of the canning machine. A cover plate 21 is secured to the upper edge of the housing while one side of the housing is open for the introduction of the fish pieces B into the path of travel of the rotating paddle wheel.

Hence as individual pieces of fish B are deposited on the floor 16 of the housing 15 at the feed-in opening therein, a paddle 12 of the paddle wheel sweeps the fish along a curved path of travel into the tunnel C. The curved wall 17 of the housing serves as a guide for the fish during this travel. Inner guide rails 22 forming an extension of the housing 15 are disposed in spaced and parallel relation to the housing wall 17 and thus form a cooperating guide for the fish pieces. These inner guide rails are narrow and extend into slots 23 formed in the paddles 12 so that they will not interfere with the rotation of the paddle wheel 11.

The paddle wheel 11 is mounted for its rotation in a horizontal position on a vertical shaft 25 and is rotated continuously in any suitable manner, as by a gear 26 carried on the lower end of the shaft. This lower end of the shaft is journaled in a bearing 27 formed in the housing 15 while the upper end is journaled in a bearing 28 formed in the cover plate 21.

The fish pieces B as they are pushed into the tunnel C by the paddle wheel 11 are received for advancement therethrough by the feeding device A. This feeding device comprises a pair of vertically spaced and parallel rotatable feed discs 31, 32 which are disposed within the housing 15 in horizontal position. The cover plate 21 extends over this portion of the housing and thus encloses the discs.

The outer marginal edge portions of these feed discs constitute movable lower and upper confining walls for a portion of the tunnel C, the inner surface of the lower disc being flush with the floor 16 of the housing so that the fish pieces may readily slide from the floor onto this lower disc. A curved vertical side wall 33 of the housing 15 partially surrounds the feed discs 31, 32 and is an extension of the inner guide rails 22. This wall provides a stationary outer confining wall for this portion of the tunnel.

The feed discs 31, 32 are mounted on a vertical disc shaft 35 which is journaled in a bearing 36 formed in the housing 15 and in a bearing 37 formed in the cover plate 21. The shaft is continuously rotated by a gear 38 which is mounted on the lower end of the shaft. This gear meshes with and is driven by a driving gear 41 carried on the paddle wheel shaft 25.

Figure 2:
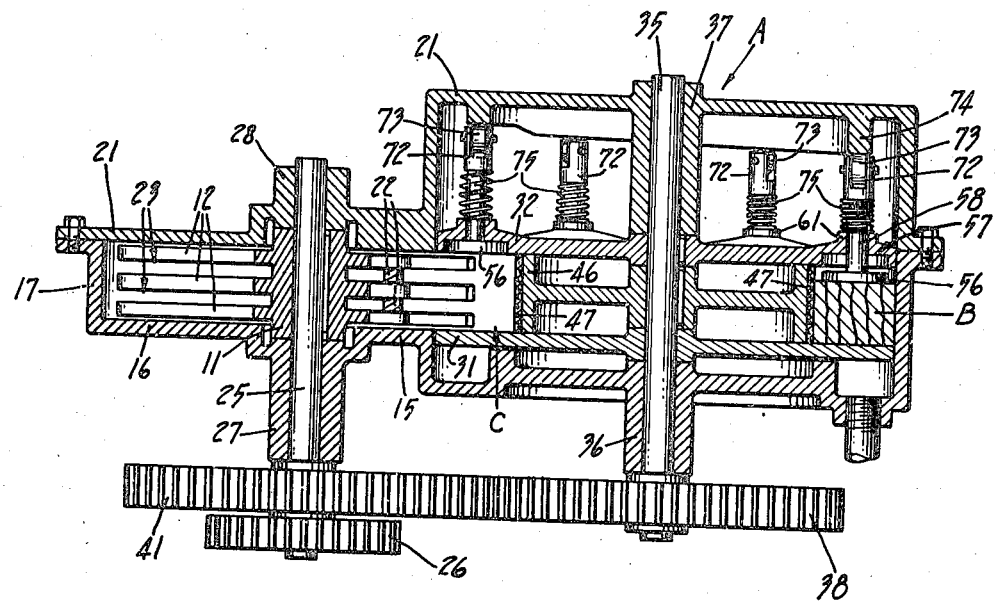
Fig. 2 is a vertical section taken substantially along the broken line 2—2 in Fig. 1.

The disc shaft 35 also carries a pulley 46 which is interposed between the lower and upper feed discs 31, 32, as best shown in Fig. 2. Hence this pulley rotates with the discs. This pulley carries an endless belt 47 which extends toward the discharge end of the tunnel C (toward the right as viewed in Fig. 1) in a short straight run 48 and operates over an idler pulley 49. The idler pulley is mounted on a stud 51 secured in a portion 52 of the housing. The straight run 48 of the belt extends along and is backed up by a stationary backing plate 53 which is formed as a part of the housing 15. In this manner the belt forms the confining inner wall or fourth side of this portion of the tunnel C.

Hence when a fish piece B is introduced into the tunnel C for advancement therethrough it is received on the lower disc 31 of the rotating feeding device A and thus its advancement by the paddle wheel 11 is continued without any stoppage during the transfer. The fish in this received position is confined between the lower and upper discs 31, 32 and the belt 47 in addition to the stationary side wall 33 of the housing 15. Since all of these parts except the wall 33 are moving, the fish piece is carried forward without any movement occurring between the discs and the fish.

Figure 3:
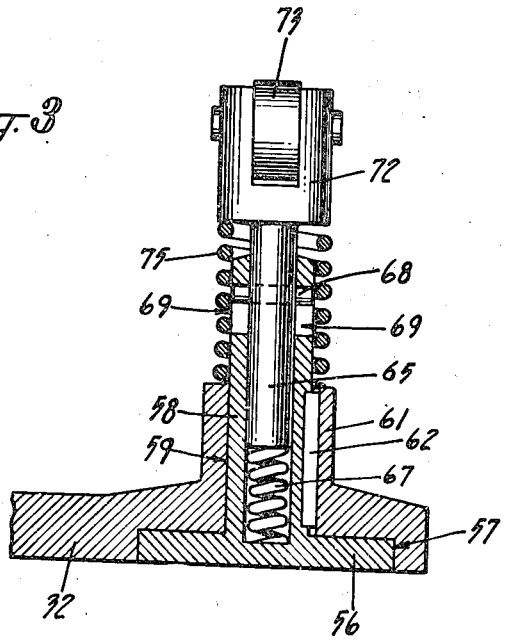
Fig. 3 is an enlarged sectional detail of a portion of the mechanism shown in Fig. 2.

In order to insure a more positive forward movement of the fish through this portion of the tunnel and between the discs 31, 32, the fish pieces B are clamped against the lower disc 31. For this purpose the upper disc 32 carries a plurality of plungers or clamping plates 56 (Figs. 2 and 3) which are disposed in recesses 57 formed in the under side of the disc and arranged in a circle around the disc. These clamping plates 56 therefore move with the upper disc. The plates are formed with upright stems 58 which extend up through bores 59 cut in bosses 61 which project above the disc. A key 62 prevents turning of each stem and its plate relative to the disc.

The stem 58 of each clamping plate 56 carries an actuating rod 65 vertically disposed in a bore 66 formed in the stem. A compression spring 67 interposed between the lower end of the rod and the bottom of the bore in the stem provides a yieldable connection between the rod and the stem. Movement of the rod in its bore is limited by a cross pin 68 which is secured in the rod. The ends of the pin extend beyond the rod and operate in slots 69 formed in the stem.

The upper end of each actuating rod 65 carries a clevis 72. This clevis in turn carries a cam roller 73 which operates against a stationary cam track 74 formed on the under side of the cover plate 21. A compression spring 75 interposed between the clevis and the stem boss 61 of each clamping plate keeps the cam roll against the cam track.

Thus as the upper disc 32 rotates, and the clamping plates 56 move around with it, the cam rollers 73 traverse the stationary cam track 74. Just after a fish piece B is received on the lower disc 31, the cam roller 73 of the adjacent clamping plate 56 rides under a depending actuating portion of the cam track 74. The clamping plate thereupon moves down into engagement with the fish. Any over travel of the cam roller in its downward movement is taken up by the compression spring 67 inside the plate stem.

The cam track is shaped so that it holds the clamping plate 56 in clamping position against the fish throughout the curved path of travel of the fish through this portion of the tunnel. When a fish piece comes adjacent the straight run 48 of the belt 47, the cam track is relieved and the clamping plate 56 under action of its spring 75 moves up away from the fish and thereby releases it.

At this place in the tunnel, the belt 47 carries the fish piece off the lower disc 31 and sweeps it within the discharge end of the tunnel. In this manner the fish pieces are conveyed through the tunnel from the paddle wheel 11 to the discharge end and are maintained in spaced relation which permits of free and easy passage without crowding of one piece against another. Thus clogging of the tunnel is prevented.

The discharge end of the tunnel comprises stationary confining walls. In this end of the tunnel the fish pieces are collected and compressed into the compact mass E as hereinbefore mentioned. This compacting and further feeding of the fish is effected by an oscillatable tumbler 81 (Fig. 1) which is of the type disclosed in the above mentioned Rooney patent. The tumbler operates in a curved seat 82 formed in one of the walls of the tunnel and is mounted on a rocker shaft 83 which is oscillated through a forward or compressing stroke and thence through a return stroke in any suitable manner.

The tumbler 81 carries a feeding blade 85, the outer end of which is pivotally connected to an operating arm 86 mounted on a pivot pin 87 carried in a lug 88 formed on the housing 15. Actuation of the operating arm 86 moves the blade 85 into and out of the tunnel. This operating arm is shifted in any suitable manner as for example by way of a link 89 as disclosed in the Rooney patent.

In operation, the blade 85 is projected into the tunnel C between the pieces of the fish B therein and then the tumbler is rocked through a forward stroke. During this stroke the blade compresses the fish pieces and feeds them forward into the canning mechanism D. At the end of this feeding stroke, the blade is withdrawn from the tunnel and the tumbler is rocked back again through its return stroke in readiness for the next forward stroke. In this manner the fish is kept moving through the discharge end of the tunnel and is delivered into the canning mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a supply tunnel for fish storage, a pair of spaced rotatable discs disposed adjacent said tunnel and constituting a pair of oppositely disposed movable walls of said tunnel, and means disposed adjacent said discs and constituting a third movable wall of said tunnel, said movable walls of the tunnel operating for advancing cut pieces of fish through the tunnel.

2. In a fish canning machine, the combination of a supply tunnel for fish storage, a pair of spaced rotatable discs disposed adjacent said tunnel and constituting a pair of oppositely disposed movable walls of said tunnel, and a belt disposed between said discs and constituting a third movable wall of said tunnel, said movable walls of the tunnel operating for advancing cut pieces of fish through the tunnel.

3. In a fish canning machine, the combination of a supply tunnel for fish storage, a pair of spaced rotatable discs disposed adjacent said tunnel and constituting a pair of oppositely disposed movable walls of said tunnel, and a belt disposed between said discs and having a curved run and a straight run extending along said tunnel and constituting a third movable wall of said tunnel, said movable walls of the tunnel operating for advancing cut pieces of fish through the tunnel.

4. In a fish canning machine, the combination of a supply tunnel for fish storage, movable top and bottom walls for said tunnel for confining and advancing cut pieces of fish through the tunnel, and devices carried by one of said movable walls and having independent movement thereof for clamping the fish pieces in place against the other wall during the travel of the fish pieces through the tunnel.

5. In a fish canning machine, the combination of a supply tunnel for fish storage, a rotatable disc disposed adjacent said tunnel its periphery constituting a movable floor for said tunnel for advancing cut pieces of fish through the tunnel, a stationary side wall concentric with said disc and located adjacent its periphery, a concentric movable wall spaced inwardly from said stationary wall, and clamping devices spaced above said disc for clamping the fish pieces in place against said moving floor during the travel of the fish pieces through the tunnel.

6. In a fish canning machine, the combination of a supply tunnel for fish storage, a pair of spaced rotatable discs disposed adjacent said tunnel and constituting a pair of oppositely disposed movable walls of said tunnel for advancing cut pieces of fish through the tunnel, and clamping devices carried by one of said discs for clamping the fish pieces in place against the other of said discs during the travel of the fish pieces through the tunnel.

7. In a fish canning machine, the combination of a supply tunnel for fish storage, a pair of spaced rotatable discs disposed adjacent said tunnel and constituting a pair of oppositely disposed movable walls of said tunnel for advancing cut pieces of fish through the tunnel, a plurality of yieldable clamping plates carried by one of said discs for clamping the fish pieces in place against the other of said discs during the travel of the fish pieces through the tunnel, and cam means for moving said clamping plates into and out of clamping position.

8. In a fish canning machine, the combination of a supply tunnel for fish storage, means adjacent said tunnel and constituting a movable wall of said tunnel for advancing cut pieces of fish through the tunnel, elements for feeding the fish pieces into place on said movable wall and for discharging the fish pieces from said movable wall, clamping devices adjacent said means for clamping the received fish pieces in place against said movable wall during their travel through the tunnel, and actuating devices for said clamping devices operable in time with the reception of the fish pieces on said movable wall and with the discharge of the fish pieces from said movable wall.

RONALD E. J. NORDQUIST.

REFERENCES CITED

The following references are of record in the file of this patent:

UNITED STATES PATENTS

| Number | Name | Date |
|---|---|---|
| 1,534,768 | Brown | Apr. 21, 1925 |
| 2,427,659 | Collyer | Sept. 23, 1947 |